United States Patent [19]

Kumamoto et al.

[11] Patent Number: 5,151,330

[45] Date of Patent: Sep. 29, 1992

[54] MAGNETIC RECORDING MEDIUM COMPRISING MAGNETIC PARTICLES AND A POLYURETHANE RESIN BINDER HAVING A POLYCAPROLACTONE STRUCTURAL UNIT

[75] Inventors: Kenji Kumamoto; Kunitsuna Sasaki, both of Hino, Japan

[73] Assignee: Konica Corporation, Tokyo, Japan

[21] Appl. No.: 614,009

[22] Filed: Nov. 13, 1990

[30] Foreign Application Priority Data

Nov. 17, 1989 [JP] Japan .................................. 1-298963

[51] Int. Cl.$^5$ ............................................... G11B 5/00
[52] U.S. Cl. ..................... 428/425.9; 428/694; 428/900
[58] Field of Search ..................... 428/694, 900, 423.1, 428/425.9

[56] References Cited

U.S. PATENT DOCUMENTS

| | | | |
|---|---|---|---|
| 4,555,449 | 11/1985 | Koleske et al. | 428/411.1 |
| 4,585,702 | 4/1986 | Osborn et al. | 428/425.9 |
| 4,634,633 | 1/1987 | Ninomiya et al. | 428/425.9 |
| 4,637,959 | 1/1987 | Ninomiya et al. | 428/425.9 |
| 4,762,902 | 8/1988 | Murphy | 528/75 |
| 4,784,914 | 11/1988 | Matsufuji et al. | 428/418 |
| 4,786,557 | 11/1988 | Kakuishi et al. | 428/418 |

OTHER PUBLICATIONS

338830

*Primary Examiner*—Paul J. Thibodeau
*Assistant Examiner*—Stevan A. Resan
*Attorney, Agent, or Firm*—Jordan B. Bierman

[57] ABSTRACT

There is disclosed a magnetic recording medium having the excellent electromagnetic conversion properties and an improved Young's modulus of a magnetic layer, wherein the magnetic layer contains a binder comprising a polyurethane resin having a polycaprolactone structural unit and a vinyl chloride resin having —SO$_3$M, —COOM, —OSO$_3$M,

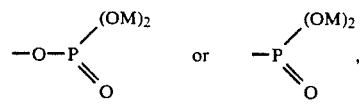

wherein M represents hydrogen, lithium, sodium or potassium.

7 Claims, No Drawings

MAGNETIC RECORDING MEDIUM COMPRISING MAGNETIC PARTICLES AND A POLYURETHANE RESIN BINDER HAVING A POLYCAPROLACTONE STRUCTURAL UNIT

FIELD OF THE INVENTION

The present invention relates to a magnetic recording medium, specifically to a magnetic recording medium having an improved Young's modulus and the excellent electromagnetic conversion properties.

BACKGROUND OF THE INVENTION

A magnetic recording medium, particularly video tape, is required to have a capability of reproducing high frequency records with a high output: an excellent surface smoothness for reducing space loss: a magnetic substance having an excellent dispersibility and a high filling density of magnetic substances for improving electromagnetic conversion characteristics: and physical characteristics satisfying the durability and life in repetitive use over a long period of time.

A recording density of a magnetic recording medium increases with a decrease in a magnetic particle size. The decreased particle size, however, causes deterioration of dispersibility of the particles, lowering of surface smoothness of a magnetic layer necessary for high-frequency recordings, output fall and bad wear resistance, which in turn cause problems of clogging video head in a VTR still mode and abrasion of a magnetic layer surface.

Therefore, binder for a magnetic layer is required to have an excellent durability and wear resistance. Various vinyl chloride-vinyl acetate binders have so far been proposed, but few binders satisfy the above requirements.

A method for improving dispersibility of a magnetic powder in a binder is proposed, in which a polar group is introduced in a binder resin used for a magnetic layer to make the binder well affinitive with the magnetic powder.

For example, the binders having a high dispersibility obtained by introducing a hydrophilic group therein to improve the affinity thereof with magnetic powder are disclosed in Japanese Patent Publication Open to Public Inspection (hereinafter referred to as JP O.P.I.) Nos. 44227/1982, 108032/1983, 1215414/1985 and 92422/1982.

JP O.P.I. No. 44227/1982 discloses vinyl chloride-vinyl acetate copolymers having metal sulfonate group; JP O.P.I. No. 108032/1983 discloses sulfonic acid group-containing vinyl chloride copolymers: JP O.P.I. No. 121514/1985 discloses vinyl chloride copolymers obtained by polymerizing monomers having a metal sulfonate group: and JP O.P.I. No. 92422/1982 discloses polyurethane resins having a polar group.

Further, JP O.P.I. Nos. 8127/1984 and 104329/1986 propose various combinations of vinyl chloride-vinyl acetate copolymers and polyurethane resins having a metal sulfonate group.

The resins having a polar group used as a resin component of a binder enable to provide a magnetic recording medium having improved electromagnetic conversion characteristics, in which a ferromagnetic metal powder is well dispersed in a magnetic layer.

However, the above binders cannot necessarily give sufficient dispersion to such substances as a magnetic powder with a specific surface area having a BET value of not less than 45 m²/g and carbon black having a poor dispersibility, and further can not provide satisfactory properties such as a Young's modulus and a resistance to a high temperature of 40 to 50° C.

As described above, there have scarcely been found the binders capable of sufficiently dispersing therein even a ultrafine magnetic powder and a less dispersible powder, and therefore it has been difficult to provide a magnetic recording medium containing a ultrafine magnetic powder while securing the prescribed levels of a durability, magnetic characteristics and electromagnetic conversion characteristics.

SUMMARY OF THE INVENTION

An object of the present invention is to provide a magnetic recording medium having a magnetic layer in which a magnetic powder is well dispersed and filled densely.

Another object of the invention is to provide a magnetic recording medium having a high Young's modulus of the magnetic layer, excellent electromagnetic conversion properties and running durability.

The above objects of the invention are accomplished by a magnetic recording medium comprising a support and provided thereon a magnetic layer containing a magnetic powder and a binder, in which the binder comprises a polyurethane resin having a polycaprolactone structural unit and a vinyl chloride resin having —SO₃M, —COOM, —OSO₃M,

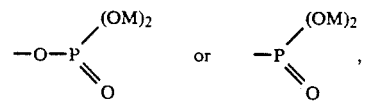

wherein M is hydrogen, lithium, sodium or potassium.

The above polyurethane resin is modified preferably with —SO₃M, —COOM, —OSO₃M,

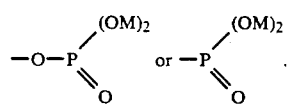

The magnetic powder used in the invention is preferably cobalt-deposited iron oxide having a BET value of 25 to 80m²/g, Al-containing alloy metal powder or barium ferrite having an aspect ratio of 2 to 10.

DETAILED DESCRIPTION OF THE INVENTION

The polyurethane resin having the caprolactone structural unit (hereinafter referred to as a polycaprolactone polyurethane resin) can be synthesized by a polyrethane synthesis method similar to a conventional one, in which a high-molecular polyol (molecular weight: 500 to 3000) such as polycaprolactone-polyol is reacted with a poly-functional aromatic or aliphatic isocyanate. The high molecular polyol may be conventional one such as polyol consisting of diol and dicarboxylic acid.

The polyurethane resin is produced by the reaction of polyisocyanate with polyol and, if necessary, with other polymers. It may be a urethan resin or urethane prepolymer having a free isocyanate group and/or a hydroxyl group, or a polyurethane resin having no reactive terminal groups, such as urethane elastomer.

The examples of isocyanate are hexamethylenediisocyanate (HMDI), diphenylmethanediisocyanate (MDI), hydrogenated MDI (H$_1$ $_2$MDI), toluenediisocyanate (TDI). 1,5-naphthalene-diisocyanate (NDI), tolidinediisocyanate (TODI), lysinediisocyanate methyl ester (LDI), and isophoronediisocyanate (IPDI). Low-molecular polyhydric alcohol such as 1,4-butanediol, 1,6-hexanediol and 1,3-butanediol may be used to control the molecular weight and characteristics of the resin.

A functional group for modification may be introduced in isocyanate, polyol or polyhydric alcohol.

Lactone-type polyester polyol having a negative functional group may be used, in which the above functional groups are introduced in lactones such as δ-caprolactone, α-methyl-1-caprolactone, δ-methyl-δ-caprolactone, γ-butyrolactone.

The polycaprolactone polyurethane resin contributes to raising a Young's modulus of a magnetic layer to thereby improve durability of the layer. In general, the dispersibility of a magnetic powder, especially a fine powder, is liable to be insufficient. The binder resin used in the invention has remarkably high adsorbability and affinity to the magnetic powder surface because of the functional groups introduced into the polycaprolactone polyurethane resin. Accordingly, the dispersibility of the magnetic powder is improved to such an extent that the intrinsic characteristics of the magnetic powder are demonstrated, whereby a dispersing time of the magnetic powder is shortened; a dispersing stability is improved: and the magnetic powder can be filled uniformly and densely in the magnetic layer, which in turn results in improving the electromagnetic conversion properties such as output and S/N ratio.

The above polycaprolactone polyurethane resin contains preferably 10 to 50 mole% of the polycaprolactone structural unit, and —SO$_3$M, —COOM, —O-SO$_3$M,

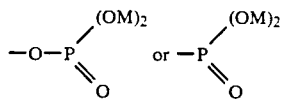

as a functional group. The ratio of the functional group present in the resin is preferably one group per 100 to 100,000 of a molecular weight of the resin.

Further, in the invention, a modified vinyl chloride copolymer may be used in combination with the polyurethane resin of the invention in order to raise the dispersibility of the magnetic powder and other fillers and increase the filling densities thereof.

The examples of the modified vinyl chloride resin are vinyl chloride copolymers having —SO$_3$M, —COOM, —OSO$_3$M,

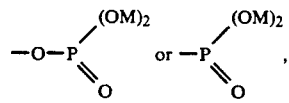

wherein M is hydrogen, Li, Na or K.

Preferred among these copolymers is a vinyl chloride copolymer comprising repetitive unit having —SO$_3$Na.

The vinyl chloride copolymer having at least one hydrophilic group selected from —COOM, —SO$_3$M, —SO$_4$M, —PO$_3$M$_2$ and —PO$_4$M$_2$ can be produced by copolymerization of vinyl chloride and a monomer having the hydrophilic group, if necessary, with other monomers.

The examples of the monomer having —COOM are unsaturated monocarboxylic acids such as acrylic acid and methacrylic acid; unsaturated dicarboxylic acids such as fumaric acid and itaconic acid: and the monoesters thereof.

The examples of the monomer having —SO$_3$M are unsaturated acids such as vinylsulfonic acid, methylvinylsulfonic acid, methacrylsulfonic acid, styrenesulfonic acid, methacrylic acid-2-ethyl sulfonate, 2-acrylamido-2-methylpropane sulfonic acid and 3-allyloxy-2-hydroxypropane sulfonic acid, and the alkali metal salts and ammonium salts thereof. Examples of the monomer having —SO$_4$M are unsaturated acids such as methacrylic acid-2-ethyl sulfonate and 3-allyloxy-2-hydroxypropane sulfuric acid, and the alkali metal salts and ammonium salts thereof.

Examples of the monomer having —PO$_4$M$_2$ are acids such as methacrylic acid-3-chloro-2-propyl phosphoric acid, methacrylic acid-2-ethyl phosphate and 3-allyloxy-2-hydroxypropane phosphoric acid, and the alkali metal salts and ammonium salts thereof. Examples of the monomer having —PO$_3$M$_2$ are unsaturated acids such as vinylphosphonic acid, acrylamide methanephosphonic acid, 2-ethyl phosphonate-methacrylate and 3-allyloxy-2-hydroxypropane phosphonic acid, and the alkali metal salts and ammonium salts thereof.

The above vinyl chloride copolymer has preferably a molecular weight of not more than 60,000 and the ratio of the hydrophilic groups present in the copolymer is preferably one group per 1,000 to 60,000 of a molecular weight of the copolymer.

The copolymer resin used in the invention is so highly hydrophilic as to enable much more improvement of the dispersibility of the magnetic powder than conventional vinyl chloride copolymer resins. This is the case particularly when a fine iron oxide magnetic powder or metal magnetic powder is used.

The ratio of the modified vinyl chloride copolymer to the polycaprolactone polyurethane resin is preferably 8/2 to 2/8, and more preferably 7/3 to 4/6.

In the invention, the above binder may contain conventional non-modified vinyl chloride resins, polyurethane resins, polyester resins, cellulose resins, phenoxy resins, thermoplastic resins, thermosetting resins, reactive resins, and electron beam-setting resins, in combination with the above resins.

The above resins are combined so that the properties of the recording medium can be optimized.

The component layers of the recording medium including a magnetic layer and a backcoat layer can be formed by conventional methods.

The magnetic layer is provided by coating a magnetic paint containing the ingredients such as a magnetic powder and a filler, which are dispersed in a binder with a dispersing agent and a lubricant.

The examples of the magnetic powder are γ-Fe$_2$O$_3$, Fe$_3$O$_4$ and the intermediate oxides thereof, cobalt-containing iron oxide magnetic powder obtained by doping or depositing cobalt atoms on the above iron oxide magnetic powders, ferromagnetic chromium dioxide powder, iron nitride, alloy magnetic powder, barium ferrite, and barium ferrite modified with a metal such as titanium and cobalt.

Of the above magnetic powders, preferred are cobalt-deposited iron oxide having a BET value of 25 to 80m²/g, Al-containing magnetic powder and barium ferrite having an aspect ratio of 2 to 10, preferably 2 to 8.

In the invention, carbon black may be used to improve light shielding and conductivity of the magnetic recording medium.

The following are the examples of carbon black having an average particle diameter of 20 to 40mµ used for the magnetic layer and backing layer of the invention:

Product of Columbia Carbon Co.:

Raven 5250, 1255, 1250, 1200, 1170, 1040, 1035, 1030, 1020, 890, 850 and 825:

Product of Cabot Co.:

Black pearls L, Regal 400, 600, 500R, 500, 330 and 99. Valcan XC-72 and P:

Product of Mitsubishi Chemical Industry Co.: CF9: #50, 52, 45, 44, 40, 32, 30 and 4000.

MA-100, 7, 8 and 11.

Further, the examples of carbon black having an average particle size of 70 to 500mµ are Raven 410 and MTP produced by Columbia Carbon Co. and HS-500 produced by Asahi Carbon Co.

In order to improve durability of the magnetic layer, the magnetic paint may contain a hardener such as isocyanate.

The examples of aromatic isocyanates are tolylenediisocyanate (TDI) and adducts thereof with active hydrogen compounds, each having preferably an average molecular weight of 100 to 3,000.

The examples of aliphatic isocyanates are hexamethylenediisocyanate (HMDI) and adducts thereof with active hydrogen compounds, each having preferably a molecular weight of 100 to 3,000. Preferred among these aliphatic isocyanates are nonalicyclic isocyanates and adducts thereof with active hydrogen compounds.

The above magnetic paint may contain a dispersing agent and, if necessary, additives such as a lubricant, an abrasive and an antistatic agent.

The examples of the dispersing agent are phosphate, amine compounds, alkyl sulfates, fatty amides, higher alcohols, polyethylene oxide, sulfosuccinic acid, sulfosuccinates, known surfactants, and the salts thereof. There may also be used the salts of polymer dispersing agents having a negative organic group such as —COOH. These dispersing agents may be used alone or in combination.

Examples of the lubricant are silicone oil, graphite, carbon black graft polymer, molybdenum disulfide, tungsten disulfide, fatty acid such as lauryl acid, myristic acid and stearic acid, and fatty acid esters having 21 to 23 carbon atoms and consisting of a monobasic fatty acid having 12 to 16 carbon atoms and a monohydric alcohol having the rest number of carbon atoms (wax). The above lubricant is used in an amount of 0.2 to 20 parts by weight per 100 parts by weight of the binder.

Examples of the abrasive are conventional materials such as fused alumina, silicon carbide, chromium oxide, corundum, artificial corundum, artificial diamond, garnet and emery. These abrasives have an average particle size of 0.05 to 5µm, and preferably 0.1 to 2µm. The above abrasive is used in an amount of 1 to 20 parts by weight per 100 parts by weight of the binder.

Examples of the antistatic agent are conductive powders such as carbon black and graphite: natural surfactants such as saponin: nonionic surfactants such as alkylene oxide compounds: cationic surfactants such as higher alkylamines and quaternary ammonium salts: anionic surfactants such as carboxylic acids and sulfonic acid: and amphoteric surfactants such as amino acids and aminosulfonic acids.

The examples of a solvent used for the magnetic paint are ketones such as acetone, alcohols such as methanol, esters such as methyl acetate, ethers such as glycoldimethyl ether, aromatic hydrocarbons such as benzene, and halogenated hydrocarbons such as methylene chloride.

Materials usable as a support are polyethylene terephthalate, polyethylene-2,6-naphthalate, polypropylene, cellulose triacetate, polyamide and polycarbonate.

The thickness of the support is about 3 to 100µm, and preferably 5 to 50µm.

A subbing layer may be provided between the support and the magnetic layer in order to improve the adherence therebetween.

EXAMPLES

The invention is illustrated in detail by the following examples.

EXAMPLE 1

The magnetic paint having the following composition for forming a magnetic layer was prepared in a conventional manner and coated on a polyester terephthalate base of 14.5µm thickness to a dry thickness 4.0µm to prepare the magnetic recording medium Sample No.1 of the invention.

| Magnetic layer coating paint composition: | |
|---|---|
| | (unit: parts by weight) |
| Magnetic powder: A | 100 |
| Alumina (average particle size: 0.6 µm) | 7 |
| Vinyl chloride copolymer (VC:H) | 13 |
| Polyurethane resin (PU:O) | 9 |
| Carbon black (average particle size: 32 mµ) | 10 |
| Stearic acid | 0.5 |
| Cyclohexanone | 500 |
| Methyl ethyl ketone | 500 |
| Toluene | 500 |
| Polyisocyanate Coronate L produced by Nippon Polyurethane Co., Ltd. | 6 |

Next, Samples No.2 to 10 were prepared in the same manner as in Sample No.1, except that the vinyl chloride copolymer and polyurethane resin were changed as shown in Table 1 and that the back coating layers were further provided for Samples No.5 to 10 by coating the magnetic paint of the following composition:

| Magnetic paint for the BC layer | |
|---|---|
| Carbon black Raven 1035 produced by Coumbia Carbon Co. | 40 |
| Barium sulfate (average particle size: 300 mµ) | 10 |
| Nitrocellulose | 25 |
| Polyurethane N-2301 manufactured by Nippon Polyurethane Industry Co., Ltd. | 25 |
| Polyisocyanate Coronate L manufactured by Nippon Polyurethane Industry Co., Ltd. | 10 |
| Cyclohexanone | 400 |
| Methylethyl ketone | 250 |
| Toluene | 250 |

In Table 1, the respective components of the magnetic powder, the vinyl chloride copolymer (VC) and the polyurethane resin (PU) are as follows:

Magnetic powder the same composition as in Example 1 was coated on the other side of the base.

Each sample was evaluated in the same manner as in Example 1, except that a 8mm video deck was used for measurement of the electromagnetic conversion properties. The results are shown in Table 1.

TABLE 1

| Sample No. | Magnetic powder | VC | PU | RF output (dB) | Lumi S/N (dB) | Chroma output (dB) | Chroma S/N (dB) | Young's modulus (kg/mm$^2$) |
|---|---|---|---|---|---|---|---|---|
| 1 (Invention) | A | H | O | −1.0 | −1.3 | −0.3 | −1.6 | 490 |
| 2 (Invention) | A | I | P | −0.8 | −1.0 | −0.2 | −1.4 | 500 |
| 3 (Comparison) | A | H | Q | −1.6 | −2.0 | −0.5 | −2.3 | 440 |
| 4 (Comparison) | A | L | R | −2.0 | −2.7 | −0.5 | −3.2 | 420 |
| 5 (Invention) | B | I | P | 1.9 | 1.6 | 3.0 | 2.7 | 690 |
| 6 (Invention) | B | J | O | 2.0 | 1.6 | 2.8 | 2.6 | 680 |
| 7 (Invention) | B | K | P | 1.9 | 1.7 | 2.9 | 2.6 | 690 |
| 8 (Comparison) | B | L | Q | 0.5 | 0.1 | 0.6 | 0.2 | 550 |
| 9 (Invention) | C | I | P | 2.5 | 2.0 | 3.0 | 2.9 | 700 |
| 10 (Comparison) | C | L | Q | 0.6 | 0.2 | 0.4 | 0.3 | 560 |
| 11 (Invention) | D | I | P | 3.2 | 3.3 | 3.0 | 2.7 | 710 |
| 12 (Invention) | D | H | O | 3.0 | 3.1 | 2.8 | 2.8 | 700 |
| 13 (Comparison) | D | L | Q | 0.8 | 1.5 | 1.5 | 1.7 | 600 |
| 14 (Invention) | E | I | P | 3.0 | 3.2 | 2.3 | 2.1 | 630 |
| 15 (Comparison) | E | L | Q | 1.0 | 1.4 | 0.8 | 1.1 | 510 |

A: Co-deposited γ-Fe$_2$O$_3$ (BET value: 30 m$^2$/g, HC: 600 Oe)
B: CO-deposited γ-Fe$_2$O$_3$ (BET value: 45 m$^2$/g, HC: 800 Oe)
C: Co-deposited γ-Fe$_2$O$_3$ (BET value: 60 m$^2$/g, HC: 800 Oe)
D: Fe—Al alloy powder (BET value: 60 m$^2$/g, HC: 1600 Oe, Fe/Al: 100/5)
E: Ba-ferrite (BET value: 35 m$^2$/g, HC: 1100 Oe, aspect ratio: 31)

VC

H: Vinyl chloride-vinyl acetate copolymer modified with a sulfo group.
I: Vinyl chloride copolymer MR-110 modified with a sulfo group, manufactured by Nippon Zeon Co., Ltd.
J: Vinyl chloride-vinyl acetate copolymer modified with a carboxyl group.
K: Vinyl chloride copolymer modified with a phospho group.
L: Non-modified vinyl chloride-vinyl acetate copolymer.

PU

O: TDI/polycaprolactone/ethyleneglycol/adipic acid: 10/40/30/20 (mol ratio), carboxyl group ratio: two groups per one molecule with a molecular weight of 70,000.
P: TDI/polycaprolactone/ethyleneglycol/phthalic acid: 10/40/30/20 (mol ratio), sodium sulfonate group ratio: 1.5 groups per one molecule with a molecular weight of 20,000.
Q: TDI/1,4-butanediol/ethyleneglycol/adipic acid: 10/10/40/40 (mol ratio), non-modified.
R: MDI/1,4-butanediol/adipic acid: 10/50/40 (mol ratio), non-modified.

Each sample was cut into a ½ inch width tape to evaluate the electomagnetic conversion properties and a Young's modulus of a magnetic layer, wherein a VHS video deck was used for Samples No.1 to 4 and a S-VHS video deck was used for Samples No.6 to 10. The results are shown in Table 1.

EXAMPLE 2

Samples No.11 to 15 were prepared in the same manner as in Example I, except that the magnetic layer paint was coated on a polyester terephthalate base of 7.0μm to a dry thickness of 3.0μm and the BC layer paint of

What is claimed is:

1. A magnetic recording medium comprising a support and provided thereon a maqnetic layer containinq a maqnetic powder and a binder, wherein the binder comprises a polyurethane resin having a polycaprolactone structural unit and a vinyl chloride resin having one group selected from —SO$_3$M, —COOM, —OSO$_3$M,

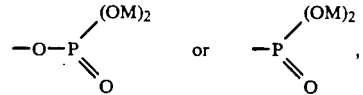

wherein M represents hydrogen, lithium, sodium or potassium.

2. The recording medium of claim 1, wherein the polyurethane resin is modified with a sulfo group, a phospho group or a carboxyl group.

3. The recording medium of claim 1, wherein the magnetic powder is Co-deposited iron oxide having a BET value of 25 to 80 m$^2$/g, Al-containing magnetic metal powder or barium ferrite having an aspect ratio of 2 to 10.

4. The recording medium of claim 1, wherein the polyurethane resin contains 10 to 50 mol% of the polycaprolactone structural unit.

5. The recording medium of claim 1, wherein the vinyl chloride resin has a —SO$_3$Na group.

6. The recording medium of claim 1, wherein a ratio of the vinyl chloride resin to the polyurethane resin is 8/2 to 2/8.

7. The recording medium of claim 6, wherein the ratio is 7/3 to 4/6.